United States Patent [19]
Bettencourt et al.

[11] Patent Number: 4,584,826
[45] Date of Patent: Apr. 29, 1986

[54] TOMATO HARVESTER

[75] Inventors: Thomas S. Bettencourt, Isleton; Darryl G. Bettencourt, Lodi, both of Calif.

[73] Assignee: Blackwelders, Rio Vista, Calif.

[21] Appl. No.: 584,823

[22] Filed: Feb. 29, 1984

Related U.S. Application Data

[63] Continuation-in-part of Ser. No. 469,003, Feb. 23, 1983, abandoned.

[51] Int. Cl.$^4$ .................................. A01D 46/00
[52] U.S. Cl. ................................ 56/327 R; 56/10.2
[58] Field of Search .............. 56/10.2, 11.9, 14.5, 56/14.7, 14.9, 15.1, 15.2, 15.5, 16.5, 327 R, DIG. 11, DIG. 14, DIG. 15, 328 R; 130/30 R; 280/405 B, 81 R, 474, 463, 468; 172/324, 466

[56] References Cited

U.S. PATENT DOCUMENTS

| | | | |
|---|---|---|---|
| 3,041,082 | 6/1962 | Burkdoll et al. | 280/81 R |
| 3,663,039 | 5/1972 | Morgan | 280/474 |
| 3,715,872 | 2/1973 | Thompson | 56/11.9 |
| 3,999,613 | 12/1976 | Porter | 56/327 R |
| 4,088,570 | 5/1978 | Bettencourt | 56/327 R |
| 4,118,311 | 10/1978 | Friedel et al. | 130/30 R |
| 4,147,017 | 5/1979 | Cortopassi et al. | 56/327 R |
| 4,256,031 | 3/1981 | Ryan | 56/11.9 |
| 4,266,617 | 5/1981 | Mullet et al. | 56/11.9 |
| 4,414,792 | 11/1983 | Bettencourt et al. | 56/10.2 |
| 4,418,516 | 12/1983 | Donovan et al. | 56/15.5 |

Primary Examiner—Gene Mancene
Assistant Examiner—John G. Weiss
Attorney, Agent, or Firm—Owen, Wickersham & Erickson

[57] ABSTRACT

A tomato harvester having a standard tractor pulling a non-self powered harvester assembly partially supported on wheels and partially supported by the tractor. The harvester assembly has a main frame made up of two parallel longitudinal beams joined together by three transverse cross members, all lying approximately on the same horizontal plane. Brackets secured to the beams and extending down below them support a pair of two-wheel truck assemblies, the wheels lying below the frame. The frame carries a pivotally attached pickup unit, with a cutter, a separator unit for separating the tomatoes from the plants, and a conveyor system for transporting the collected tomatoes and delivering them to bin-trailers. A tongue comprises the sole structural member tying together the harvester assembly and the tractor, and carries hydraulic conduits leading from said tractor power-take-off unit to operate the powered devices of the harvester assembly, including apparatus for automatically keeping the cutter at a constant depth below ground. The harvester carries a hydraulic fluid storage tank and a hydraulic fluid cooling device.

10 Claims, 17 Drawing Figures

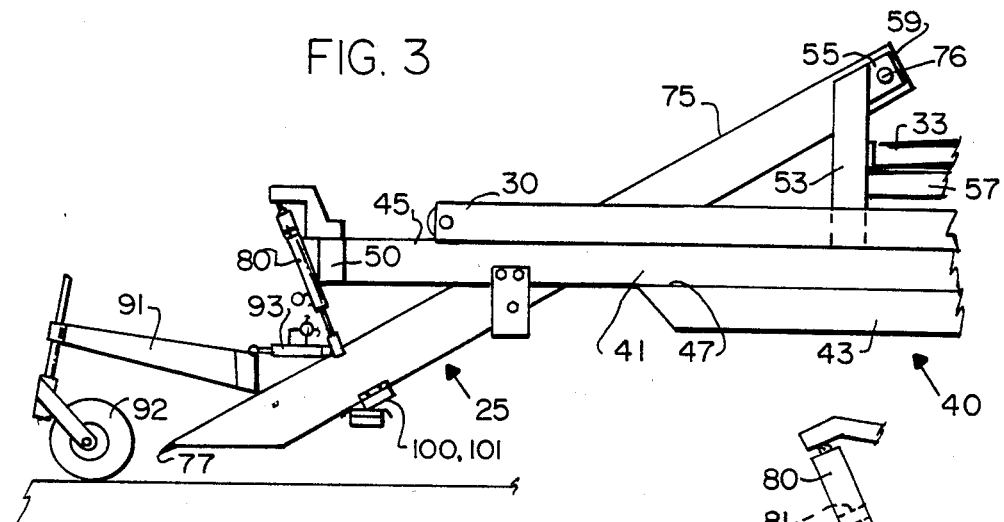
FIG. 3
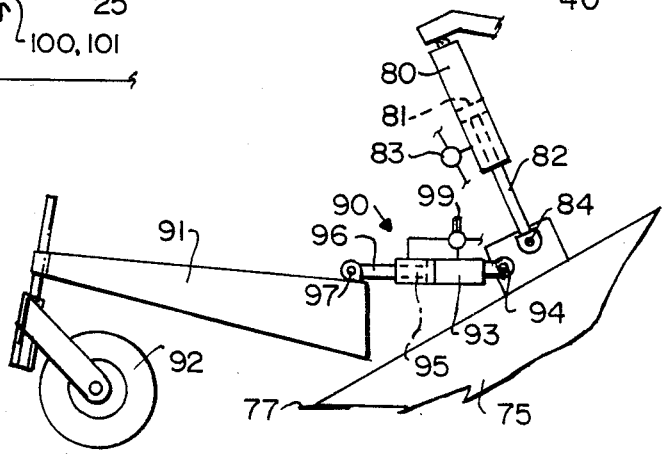
FIG. 3-A
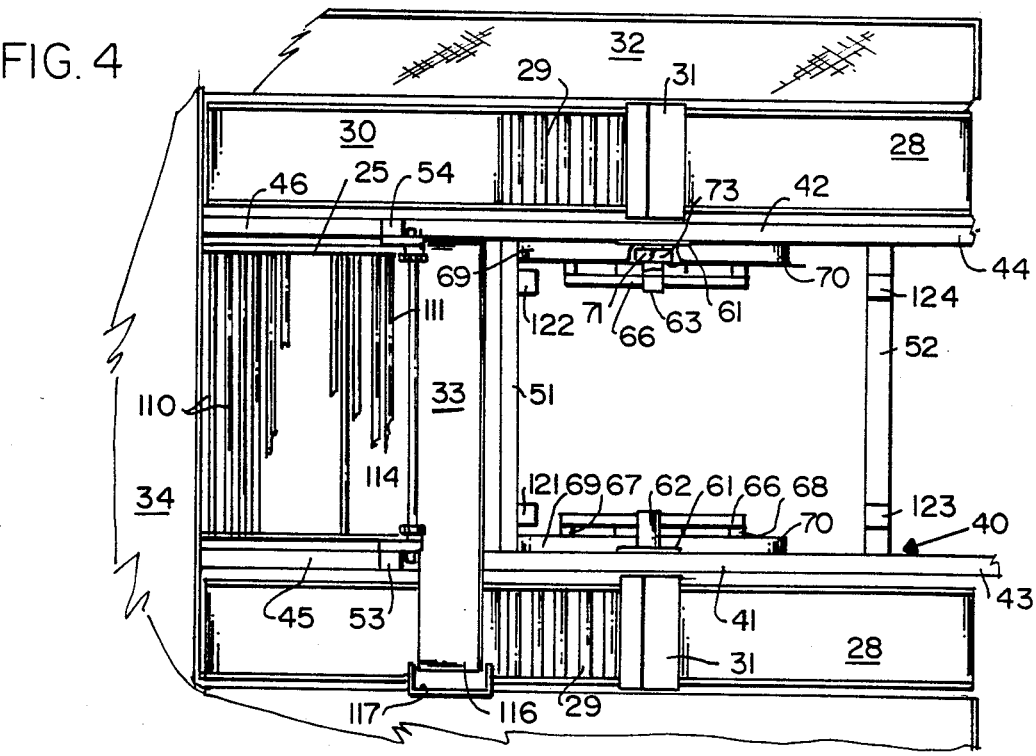
FIG. 4

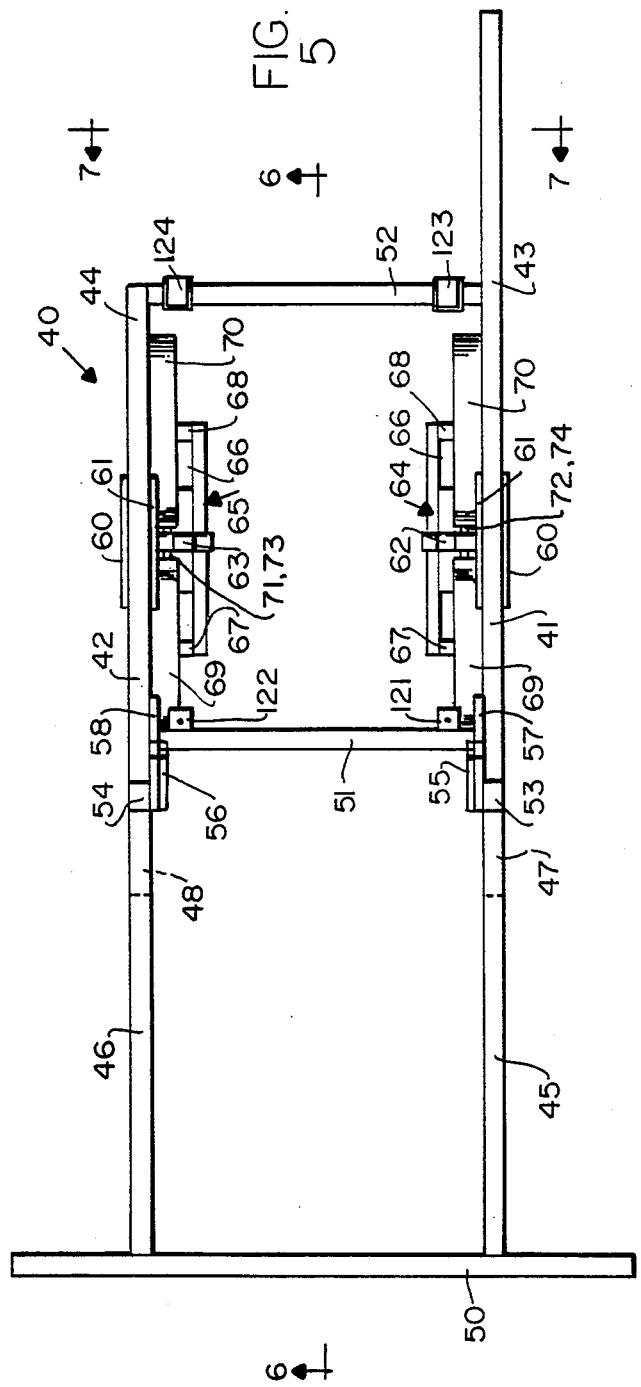
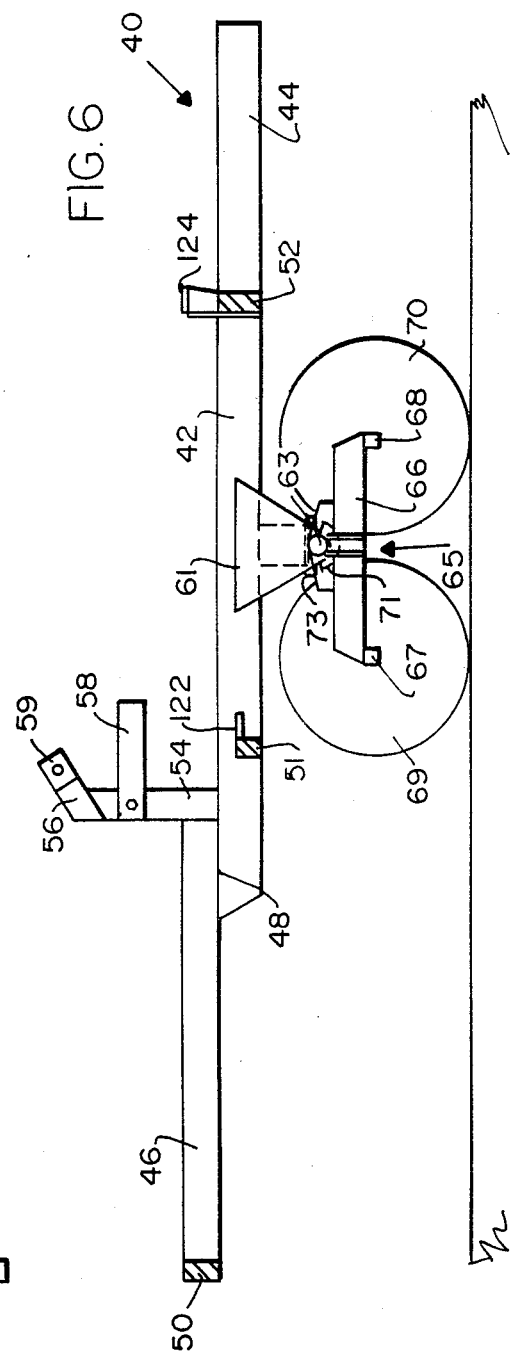

TOMATO HARVESTER

This invention relates to improvements in tomato harvesters and tomato harvesting.

REFERENCE TO RELATED CO-PENDING APPLICATION

This invention is a continuation-in-part of application Ser. No. 469,003, filed Feb. 23, 1983, now abandoned.

BACKGROUND OF THE INVENTION

At present, tomato harvesters are very expensive, their price, as of 1982, approaching $200,000.00 per harvester. One reason why they are expensive is that a large proportion of the cost of each harvester is the cost of the engine, its support structure, and its related parts for propelling the harvester and its moving parts; for all current commercial tomato harvesters are self-propelled, partly so that the operator controlling the tractor's forward movement through the field can also control the depth at which the tomato plant stems are severed and the amount of dirt taken up by the harvester's pickup.

The high cost of harvesters has meant that farmers with relatively small areas planted in tomatoes have been unable to take advantage of efficient mechanical harvesting, unless they could do so cooperatively or from someone who owned a harvester and was willing to lease it or rent it to them or to use it for them in their fields. (Currently available tow-type harvesters, such as there are, have been small, low capacity machines.) Since all the tomatoes in a given agricultural area tend to ripen at about the same time for mechanical harvest, this has caused difficulties in scheduling and allocating harvesters among the smaller farms. Even for the larger farms the numbers of harvesters that could be afforded for large plantings of tomatoes was limited by the cost of the harvesters and by the cost of operating them.

Another problem of the self-propelled harvester, has been that they have had to be very heavy. Their weight made it expensive to freight them from one location to another, increased the fuel cost during operation, and also caused the harvesters to bear heavily on the soil in the field, especially, when that soil had been softened by a rain.

Even when the conditions were good for harvesting, the axles for the wheels of the harvester were low to the ground and could easily sink down into contact with the ground. Furthermore, the self-propelled harvesters have had numerous cross members, including not only the wheel axles but other parts which have often been so low as to lie only 12 to 18 inches above the ground on hard soil, and since the wheels are usually run in furrows on each side of a raised bed, and since the furrows are typically six to eight inches deep, the cross members are often as low as four to twelve inches above the ground in the bed, and when the wheels sink into the dirt in the furrows, this distance is even further lowered. It has therefore been difficult to complete harvesting when the soil has been softened as by rain, and even worse when the soil is somewhat muddy, for then the mud has tended to build up on these cross members and rather frequent stops had to be made to clean them off.

Another problem with the self-propelled harvesters has been that they have had a long turning radius, because of their long wheelbases. Farmers like to utilize their fields to the full, but when harvesters require a substantial amount of maneuvering room, some crop acreage has to be sacrificed and also time is wasted during the maneuvering when moving from the end of one row to the beginning of a succeeding row.

The height or depth control problem for the pickup elevator and its cutting device has been recently ameliorated or solved by the use of an automatic distance-measuring device coupled with the raising and lowering mechanism for the harvester's pickup unit, which supports the sickle blade and also supports the elevating conveyor carrying the tomato plants back to the separator unit. As shown in co-pending patent application, Ser. No. 363,642, filed Mar. 30, 1982, it has been found that ultrasonic distance-measuring apparatus makes possible automatic control of the level at which the sickle or other cutting device rides below the soil and cuts off the stems of the tomato plant, and that variations in soil surface can be accommodated by coupling these ultrasonic devices to the raising and lowering mechanisms for the pickup unit. Use of these automatic devices frees the driver from watching the height of the forward end of the pickup unit, so that he has to think only of steering and speed, and therefore also makes it more attractive than it would otherwise be to separate the propelling device from the harvester, although even without automatic height control this separation can be obtained.

OBJECTS OF THE INVENTION

Among the objects of the invention are to make it possible to provide much less expensive tomato harvesters —harvesters which may cost as little as half what comparable self-propelled harvesters cost, while still retaining the high capacity of a self-propelled machine. It also makes it possible to reduce the cost of operation of the tomato harvester in the field.

Another object of the invention is to provide a harvester requiring less room when making turns or going from the end of a harvested row to the beginning of the row next to be harvested.

Another object of the invention is to reduce the weight of the tomato harvester so that it takes less power to move it through the field and makes it more feasible to harvest wet or otherwise softened fields.

Another object of the invention is to provide a harvester employing a tractor that spans a single row of tomatoes, —i.e., spans one tomato bed while its wheels ride in the furrows that bound the bed on opposite sides-, —in combination with a harvester having its wheels the same distance apart as those of the tractor. Furthermore, the harvester and the tractor are so connected together that the harvester can be offset relative to the tractor. As a result, the harvester can harvest a previously unharvested row or bed of tomatoes while the tractor, offset therefrom, rides over an already-harvested bed; therefore the tractor does not damage the unharvested tomato beds.

Another object is to provide a very maneuverable tractor-harvester combination that can be expanded or contracted in overall width between direct trailing and offsetting.

Another object of the invention is to eliminate cross members in the harvester up to a considerable height. This height of the lowest cross members may be as high as forty inches or possibly even higher. No cross members are likely to come into contact with the soil, other than the wheels and the sickle at the front end of the pickup unit, which is intended to operate below the surface of the soil.

A similar object is to eliminate the cross members below the separator unit, on which, heretofore, organic matter, soil, and tomato juice from discarded or culled tomatoes have tended to build up.

Another object of the invention is to obviate the need for assist units formerly needed to load the tomato plants onto the pickup conveyor.

Another object of the invention is to provide a tomato harvester which can be drawn through the field during harvesting by a standard tractor. A related object is to enable the tractor to be offset from the harvester so that the tractor does not ride over the bed being harvested, but rather to one side of it, over a bed that has been previously harvested, or at an end of the field over unplanted space.

Another object of the invention is to provide a drawn harvester unit, which incorporates automatic height control of the pickup unit and its sickle.

Another object of the invention is to simplify the shipment and assembly of tomato harvesters by enabling their partial disassembly for shipping, into various subassemblies which are easily and readily put onto the main frame when desired.

Another object of the invention is to simplify the elimination of dirt, especially of clods carried by the pickup unit and also by picking up fewer clods and less dirt and getting rid of them more easily.

Other objects and advantages of the invention will become apparent from the following description of a preferred embodiment.

SUMMARY OF THE INVENTION

The invention provides a tomato harvester, preferably comprising two vehicles: (1) a standard tractor fully supported on its own wheels and having its own motive power plus a power take-off unit, and (2) a novel harvester assembly having no motive power, partially supported on wheels and connected to and partially supported by said tractor and also relying on the tractor's power take-off unit for driving its conveyors, shaker, sickle, and so on. However, if desired the harvester assembly may be self propelled; while this loses some advantages of the preferred harvester, it retains some others.

This novel harvester assembly preferably includes a novel main frame having as its main elements two parallel longitudinal beams transversely spaced apart from each other and having three spaced apart transverse cross members—front, intermediate, and rear cross members. All these beams and cross members lie approximately on the same horizontal plane. There may be a small upward step from the rear portion of the beams to their forward portion, but this is not a large departure from the plane. At or near the intermediate cross-member there may be a couple of support pillars, each secured to a beam and extending up from them.

A pair of bracket assemblies secured to the beams, facing and parallel to each other, extend down below the beams, and each of these bracket assemblies supports a truck assembly. Each truck assembly includes a pair of wheels in fore-and-aft relationship mounted for fore-and-aft vertical pivotal action between limiting stops. Each truck extends down below its respective supporting bracket assembly, and each truck has a pair of stub shafts for rotatably supporting its two wheels. Although the wheels themselves lie below the frame, no axles, shafts, or other cross members extend across the frame below the main plane of the frame, and these four wheels are the only wheels attached to the frame. The frame-wheel combination is a very important feature of the invention.

The wheels of the harvester assembly and the wheels of the tractor are spaced apart widthwise by the same distance,—a distance sufficient so that they ride in furrows on each side of the parallel rows of beds of tomatoes. The harvester assembly may be pulled directly behind the tractor and is sometimes. However, during most of the harvesting the tractor is offset one bed from the harvester assembly and rides over an already harvested bed or an unplanted area on one side. This is made possible by a tongue which is pivotally attached at its rear end to the center of the front cross member and is detachably and pivotally attached at its front end to the tractor. This tongue is the sole structural member tying together the harvester assembly and the tractor; it transmits a portion of the harvester's weight to be borne by the tractor, and it carries hydraulic lines connected to the tractor's power take-off unit and used for operating various things on the harvester. Locking mechanism enables maintaining the off-setting of the tractor relative to the harvester. Moreover, a hydraulic-cylinder piston, horizontally arranged, preferably has one end pivotally attached to the tongue and the other end pivotally attached to the frame of the harvester, thereby enabling change of offset during maneuvering at the ends of rows as well as at other times. The main hydraulic pump may be mounted on the forward end of the tongue.

A tomato-plant cut-off and pickup unit is pivotally attached to the upper ends of the support pillars of the frame and extends forwardly from the frame. It is also connected to the frame by hydraulic apparatus having one end connected to the front cross member. At its forward end, the pickup unit supports a suitable cutter, such as a powered sickle, for severing the tomato plant stem from its roots. An elevating pickup conveyor extends rearwardly from the cutter at a low angle of about 30 degrees from horizontal; this conveyor carries the tomato plants severed by the cutter rearwardly and upwardly to an upper end of the pickup device. The hydraulic apparatus referred to comprises a pair of hydraulic cylinders and pistons for raising and lowering the front end of said pickup unit about the rear pivot that is secured to the main frame's support pillars.

Preferably, the pickup unit includes an ultrasonic height detector and electrical and hydraulic circuits for automatically raising and lowering the sickle and the front end of the pickup conveyor, to keep it at a desired distance below ground at all times—as can be set manually and is also manually adjustable during operation if desired. The pickup unit may also include a pair of gauge wheels that run in the furrows on each side of the bed being harvested, and their relation to the pickup unit may be related to the automatic depth control system.

Just to the rear of the pickup unit, the main frame supports a separator unit, such as a shaker, for separating the tomatoes from the plants. This unit may be bolted to the rear cross member and to the intermediate cross member and an readily be removed from them, as when shipping to distant destinations and can as readily be reattached. The forward end of the separating unit is spaced rearwardly from the upper end of the pickup elevating conveyor, to accommodate a transversely moving clod conveyor, mentioned again below. The separator unit includes, beneath its walker bars or other shaking apparatus, an open-bar type of collecting conveyor, for collecting the separated-out tomatoes and carrying them to the rear of the separator unit. The rear of the separator unit also dumps to the ground the plants and trash.

Rear cross conveyors, supported by the frame, receive the tomatoes from the collecting conveyor and move them in two oppositely directed transverse streams to beyond the sides of the separator unit. There, they transfer the tomatoes to forwardly moving conveyor systems leading to and through sorting and culling stations, the culling being done either manually or by machine or both.

The clod conveyor is supported by the support pillars approximately above the intermediate frame cross member, along a transverse line below the space between the upper end of the pickup unit and the forward end of the separator unit. Clods, loose dirt, and loose tomatoes fall through that space and onto the clod conveyor, which carries them to one side of the harvester assembly, where operators can remove good tomatoes and place them on a forwardly moving conveyor, while the remaining material is dumped out to the ground at a distal end of the clod conveyor.

A forward cross-conveyor and delivery device is supported transversely by the front cross member of the main frame. It receives tomatoes from the forward end of each forwardly moving conveyor system and delivers them to one side of the harvester at an outboard location, where a suitable truck trailer is moved along to one side of the harvester, in the usual manner.

The hydraulic circuit has a pump powered by the tractor power-take-off unit, conduits extending therefrom to the various moving devices on the harvester, including the elevating conveyor, the power raising and lowering device for the pickup unit, the separator unit's shaking apparatus, the collecting conveyor, the rear, front, and delivery cross conveyors, and the forwardly moving conveyors system. The conduits join in two manifolds, one connected to a hydraulic fluid storage unit supported by the frame and the other to a hydraulic fluid cooling unit also supported by the frame, both of these units being located so that their weight accomplishes a counterbalance of the harvester apparatus.

The harvester assembly provides side platforms for sorting and a platform for use by a controller, who can stand there and operate various controls, including control of the depth of the sickle in the bed. In some systems, the controller is not needed or can merely observe and serve as a safety controller, especially when an automatic height control system is used in connection with the pickup unit.

BRIEF DESCRIPTION OF THE DRAWINGS

FIG. 3 is a view in side elevation of a portion of the pickup unit at the front of the harvester assembly, and showing a typical location for the control device of the automatic height control device.

FIG. 3A is an enlargement of a portion of FIG. 3 relating to the hydraulic cylinders.

FIG. 4 is a fragmentary top plan view of the harvester assembly, with the separator unit removed to show what lies below it.

FIG. 5 is a top plan view of the main frame of the harvester assembly together with its wheel support unit and wheels.

FIG. 6 is a similar view in side elevation and in section taken along the line 6—6 in FIG. 5.

FIG. 12 shows the tractor-harvester combination just finishing with one row; already harvested rows lie to the right, and unharvested rows lie to the left.

.FIG. 13 shows how the tractor harvester combination leave the just harvested row, so that the wheels do not come into the unharvested row just to the left.

FIG. 14 shows the tractor-harvester combination going down a limited space headland.

FIG. 15 shows the combination turning form the headland into a row to be harvested, and FIG. 16 shows the tractor and harvester ready to cater the next row to be harvested.

DESCRIPTION OF A PREFERRED EMBODIMENT

Figure 1:
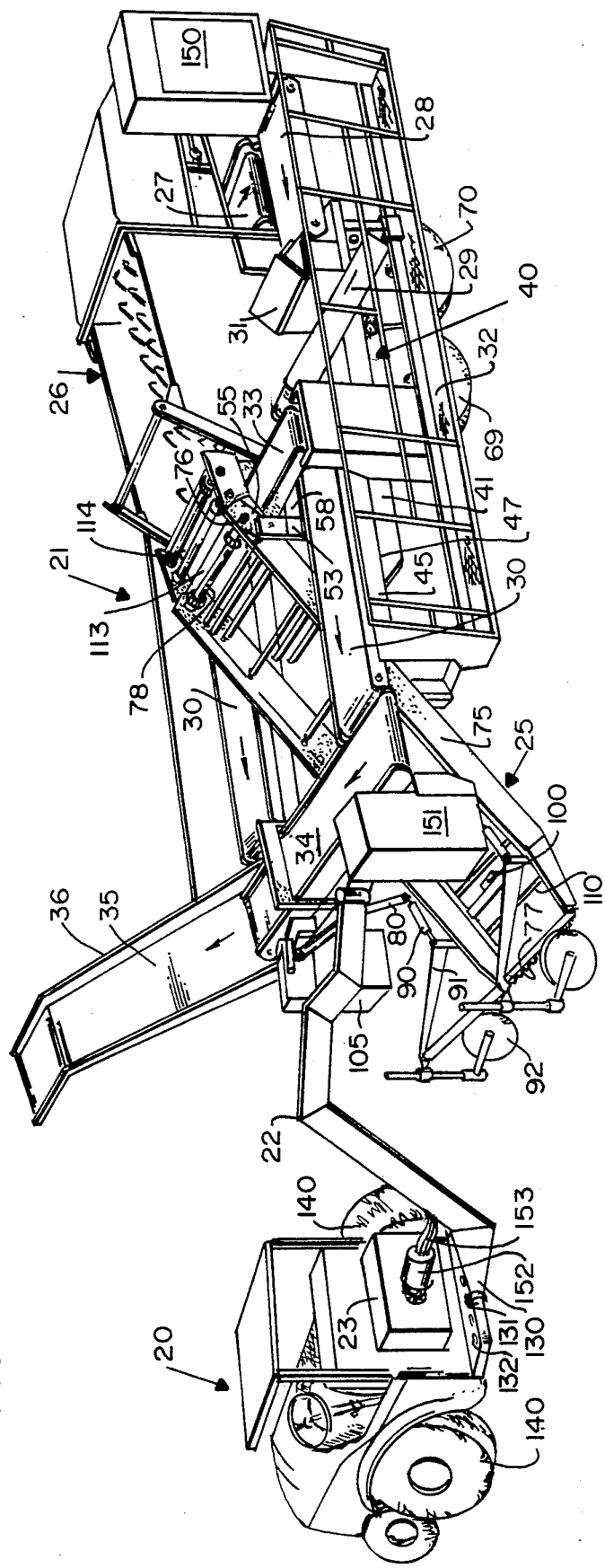
FIG. 1 is a view in perspective of a tomato harvester embodying the principles of the invention, and comprising a tractor pulling a harvester assembly.
Figure 2:
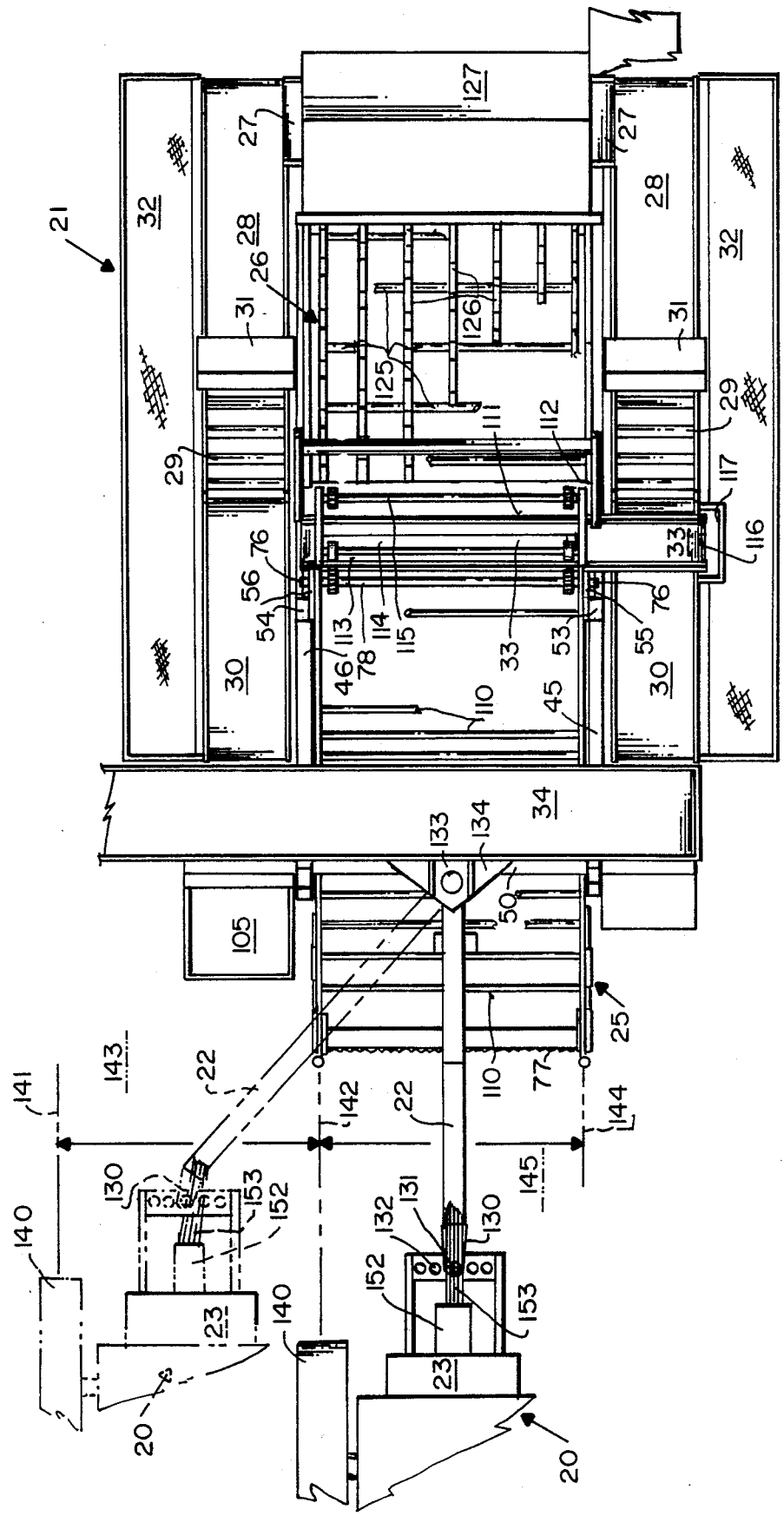
FIG. 2 is a top plan view of the conveyor of FIG. 1 with portions of the rear of the harvester assembly and at the front of the tractor being broken off to conserve space. In broken lines the tractor is shown in an offset position as it is used for harvesting, and in solid lines is shown in the straight-on position which is used when moving the harvester from one field to another, as along roadways.

General description (FIGS. 1 and 2)

The drawings show an embodiment of the present invention which illustrates the principles of that invention. It is apparent that there can be changes in many parts of the device without departing from the spirit and scope of the invention as stated in the claims at the end of the application, but the example will make it easier to understand the purpose of the invention and how it can be carried out. As shown in FIGS. 1 and 2, the invention preferably comprises a standard single-row-spanning tractor 20 and a non-self-propelled single-row-spanning harvester assembly 21. If desired, however, the assembly 21 may be self-propelled. The two are connected together by a tongue 22, which is shaped so as to avoid interference with any of the other parts of the assembly 21. The tongue 22 is made sufficiently long so that the harvester assembly 21 may be offset by a full row to either side of the tractor 20. Power apparatus explained below enables this to be done and enables the change in relative position needed to vary between offsetting and direct trailing and intermediate positions during maneuvering at the ends of rows. The tractor 20 may be of any suitable type; it may be separately acquired and used for other work; many types of agricultural tractors are suitable. The tractor 20 provides the motive power for the harvester 21 and has a power take-off device 23 for the hydraulic system of the harvester 21.

Figure 9:
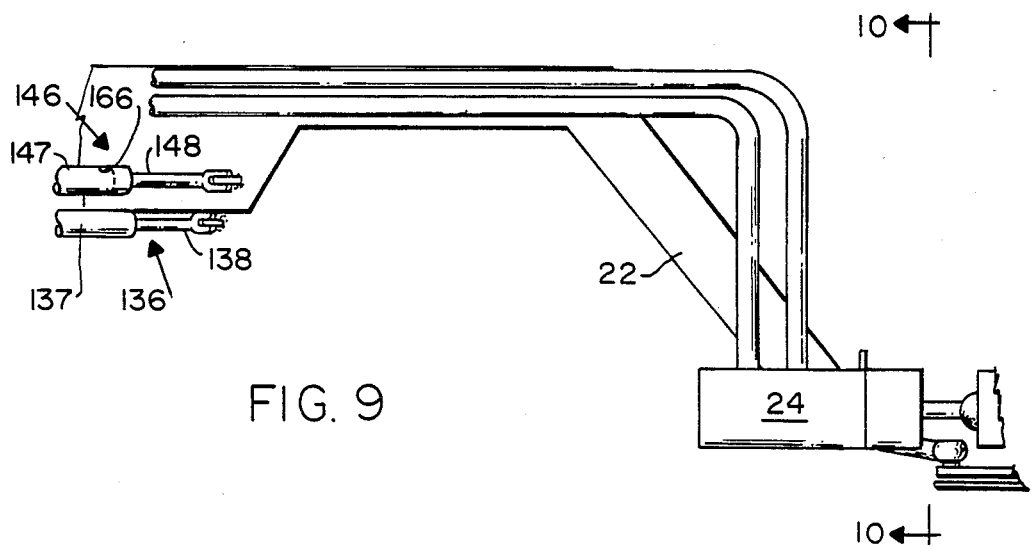
FIG. 9 is a fragmentary view in side elevation of a preferred tongue structure for linking the harvester assembly to the tractor.

Preferably, the power take-off device 23 supplies 155 horsepower at 1000 r.p.m. Its connection may be a 1-⅜-21 involute spine. A pump 24 for the hydraulic system is preferably located on a front portion of the tongue (See FIG. 9) and is directly connected to the power take-off device 23. The pump 24 should have a maximum pressure of about 1500 p.s.i. and be able to pump about 108 gallons per minute at 1000 r.p.m.

As shown in FIGS. 1 and 2 the harvester assembly 21 includes all the basic units of contemporary tomato harvesters, being similar in many ways to the standard UC-Blackwelder harvesters. Thus, the assembly 21 includes a pickup unit 25, a separator unit 26, and suitable conveyor systems and sorting mechanisms which deal with the separated tomatoes, including rear cross-conveyors 27, forwardly moving conveyors 28, 29, and 30 at each side of the unit, electric mechanical sorters 31 and personnel-holding platforms 32 on each side of the unit, a clod conveyor 33, a front cross-conveyor 34, and a delivery system 35 on an outboard support structure 36. In fact, in most instances these units may be identical to what it used in current models of the UC-Blackwelder tomato harvesters.

Figure 7:
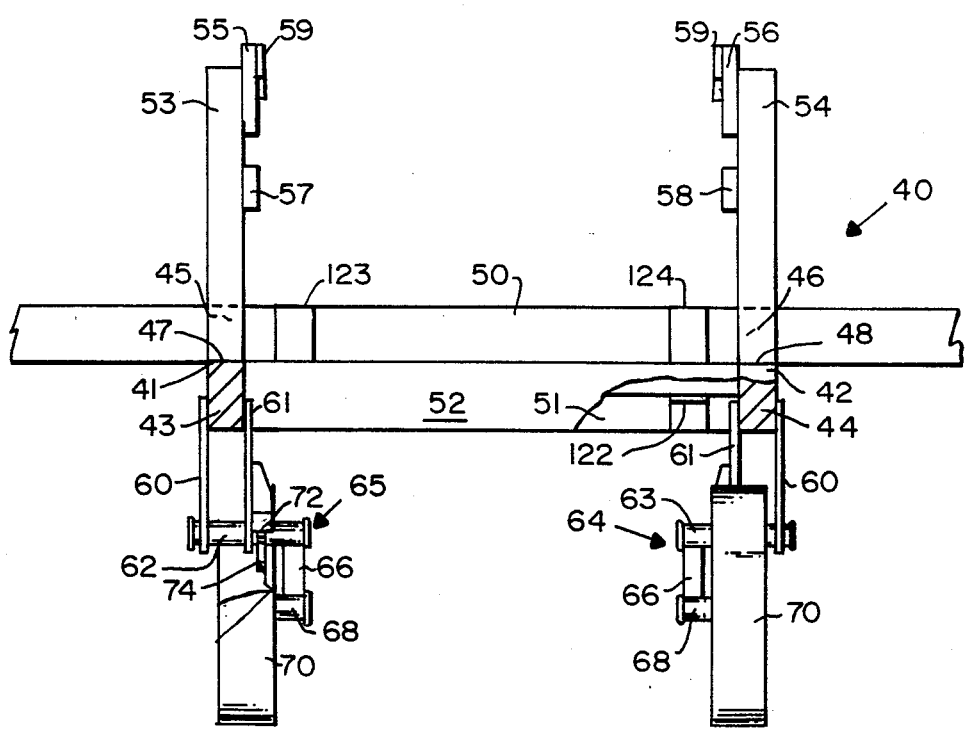
FIG. 7 is a view in section taken along the line 7—7 in FIG. 5, with some portions cut away and shown in in section.

The main frame 40 (FIGS. 5–7)

However, all these units are carried by a novel and significantly different main frame 40, and are assembled thereon in a novel manner. The main frame 40 is best shown in FIGS. 5–7 and comprises two longitudinally extending beams 41 and 42, the beam 41 being somewhat longer and extending further to the rear than the beam 42, for a purpose to be described later. Each beam 41, 42 is preferably made stepped to provide a rear portion 43, 44, respectively, and a forward portion 45, 46, respectively, the forward and rear portions overlapping and welded together at 47, 48. The purpose is to make simpler the mounting of the various units on the frame 40 at their proper heights.

These two beams 41 and 42 are joined together transversely by three cross members 50, 51, and 52, there being a front cross member 50, which is longer than the other two and extends beyond the beams 41 and 42 on both sides, an intermediate cross member 51, and a rear cross member 52 at the rear end of the shorter beam 42. There are no other structural cross frame members in between the beams 41 and 42.

The main fame 40, as described, is preferably made to lie substantially on a single plane. By "substantially", what is meant is that the stepping of the two longitudinal beams 41 and 42 results in departure from a strict plane, but not much; the cross members 50, 51, and 52, too are not precisely co-planar, but again are nearly so. This main frame 40 supports various frame superstructures, not all of which is shown in FIGS. 5–7. These figures do show a pair of vertical support pillars 53 and 54 near and preferably forward of the intermediate cross-member 51. The pillars 53 and 54 each carry an angle bracket 55 or 56 at its upper end, preferably tilted rearwardly, and also preferably carry a pair of support blocks 57, 58 for the clod conveyor 33, as described below. Each angle bracket 55, 56 carries a strengthening member 59 at its upper end.

In between the intermediate cross member 51 and the rear cross member 52, a pair of brackets 60 and 61 are secured to each of the frame beams 41 and 42, one on the outside and one on the inside of each beam 41, 42. The brackets 60 and 61 may be generally triangular, inverted, and extend downwardly. While these brackets 60 and 61 may be secured so that they are movable fore-and-aft as an assembly along the beams 41 and 42, as by slots and bolts, usually they are each welded directly to the beam portions 43 and 44. Each bracket pair 60, 61 pivotally supports by means of a stub shaft 62 or 63, a truck assembly 64 or 65, each comprising a fore-and-aft extending truck frame member 66 (such as a four-by-six inch steel tube), supporting near its ends a forward stub shaft or axle 67 and a rear stub shaft or axle 68. On their respective stub shafts 67, 68 the truck's two wheels—a front wheel 69 and a rear wheel 70 are mounted to each side of the assembly 21. Note that each wheel 69, 70 is mounted on a separate stub shaft 67 or 68, and that there is no axle that goes across between the pair of wheels 69 or between the pair of wheels 70. Each truck 64, 65 is supported pivotally by its stub shaft 62 or 63 and is provided with a pair of stop members 71 and 72 which cooperate with stop portions 73 and 74 of the bracket pair 60, 61 to prevent the pivotal action from raising either wheel 69 or 70 too high relative to the other.

It will be noted that the entire main frame 40, except for its brackets 60, 61 lies above the top of the wheels 69 and 70, and it has no members which go down lower than the stub shafts 67, 68 about which the wheels 69 and 70 rotate. This fact is also shown in FIG. 4, and it will be seen that as a result, anything that drops from the separator unit 26 cannot collect on cross members, and also that no matter how soft the field is, this harvester assembly 21, which is necessarily substantially lighter than previous self-propelled tomato harvesters, due to the fact that it carries no engine and associated parts, is not impeded in any way by low cross members that could possibly get into contact with the ground.

The pickup unit (FIGS. 1–4 and 8)

The pickup unit 25 has a pickup frame 75 which is pivotally attached by pivot members 76 (FIG. 2) to the angle brackets 55 of the support pillars 53 and 54, somewhat forward of the separator unit 26. The forward end of the pickup frame 75 carries a cutter, preferably a powered sickle 77 and is lifted and lowered relative to the frame 40 by a pair of hydraulic cylinders 80 (see FIG. 3), each secured pivotally to the beam 41 or 42, with a piston 81 having a piston rod 82 secured pivotally to the frame 75.

The lifting is provided by swinging up the header frame 75 under power about its pivots 76, which are at opposite ends of a shaft 78 relative to the main frame 40; downward movement is accomplished by release and by gravity. As in application Ser. No. 363,642 a suitable valve 83 which may be controlled manually by the tractor operator to send fluid into one side of the hydraulic cylinder 80 in order to raise the header frame 75 relative to the main frame 40, lowering being accomplished by release of hydraulic pressure and gravity. The manual control (1) places the hydraulic valve 83 in detented position for automatic operation and (2) lifts the header at the ends of rows.

Figure 8:
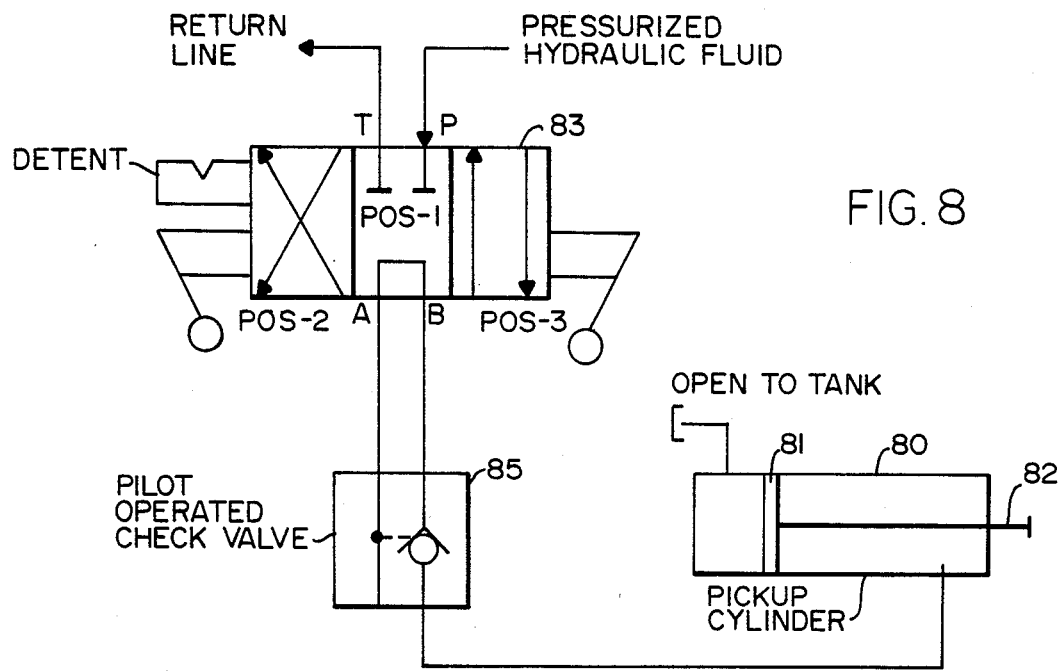
FIG. 8 is a hydraulic circuit diagram showing how the header is placed in a free-floating condition.

FIG. 8 shows that the valve 83 is a three-position four-way valve, having an inlet port P for pressurized hydraulic fluid, an outlet return-line port T, and ports A and B that are connected to a pilot-operated check valve 85. In its first position, the port P is dead-ended, the port T is not connected to any other port, and the ports A and B are connected to each other. This position holds whatever pressure there is applied to the piston 81 in the cylinder 80.

In position two, the detented position, the port P is connected to the port A, the port B is connected to the port T, and the check valve 85 is opened. Thus, no pressure is exerted against the piston 81 in the rod side of the cylinder 80; since the opposite side of the cylinder 80 is open to the return line, there is no pressure on either side of the piston 81, and the header frame 75 can float freely.

In position 3, the port P is connected to the port B, sending fluid to force the check valve 85 off its seat and apply pressure to the rod side of the cylinder 80. The return port T is connected to the port A. The fluid on the rod side of the cylinder 80 therefore actuates the piston 81 to lift the header frame 75.

During actual harvesting, the valve 83 is in its detented position, and the pickup unit or header 25 is therefore in a free-floating condition. A telescoping assembly follows the piston rod movement and is used in conjunction with a transducer to indicate the amount of movement, which is proportional to the height of the sickle 77 relative to the main frame 40.

A similar hydraulic device 90 may be used to swing the header frame 75 and a gauge frame 91 relatively to each other. On the gauge frame 91 are mounted gauge wheels 92. The gauge wheels 92 do not provide any significant support for the harvester assembly 21, but merely enable the control of the height of the forward end of pickup unit 25 by running in the furrows on each side of the bed to be harvested. This power device 90 may include (see FIG. 3A) a cylinder 93 secured at a pivot 94 to the header frame 75, a piston 95, a piston rod 96 secured to a pivot 97 on the gauge frame 91, a valve 98, and a solenoid 99 for the valve 98. Typically, the header frame 75 moves relative to the gauge wheel frame 91, since the gauge wheels 92 are preferably kept seated in the furrows, and the valve 83 is in the detented position so that the header 25 floats freely and does not oppose the adjustments. Thus, the solenoid 99 controls the height of the cutting-sickle 77 in relation to the ground, acting through the valve 98 and the hydraulic device 90.

As explained in co-pending patent application Ser. No. 363,642, filed Mar. 30, 1982, these hydraulic units 80 are used in connection with an automatic height control device 100 which is described in detail both there and in a separate co-pending patent application Ser. No. 363,644, filed Mar. 30, 1982, and therefore need not be repeated here. The apparatus described there may be employed, or an improved unit which is being filed in a co-pending application by James E. Seiferling. In either event, the ultrasonic device 100 is mounted in a suitable housing 101 that is mounted on the underside of the pickup frame 75, and determines the distance from itself to the ground level, as compared with that of a calibration bar carried on it, and by calculations made in a suitable microprocessor the hydraulic device 90 is actuated to raise and lower the device 100 (along with the pickup frame 75) and to do so in an amount which compensates for the location of the distance-determining mechanism, relative to the sickle blade 77 which cuts off the tomato plants.

Use of this device is strongly recommended, because without it an operator must exercise manual control over raising and lowering the pickup unit. Such an operator may still be desirable as a backup, and also to help in other ways, and for that purpose a platform 105 and in a box-like structure 106 are mounted on the main frame 40. There the operator may stand, and, with controls located there, either this operator or the tractor operator may control the times at which the pickup unit 25 is to be lifted high, as when changing rows, or moving along the side of a highway or road. During the harvesting the automatic height control is preferably employed (by placing the valve 83 in its detent position), to maintain the harvesting efficiency of the device. However, if the automatic control device should become inoperative for any reason, or be unsatisfactory, or for any other reason, the operator on the platform 105 can take over, and if the owner wishes to operate that way and not use such an automatic device, he can do so, too.

The pickup unit 25 includes an elevating conveyor 110, which is preferably an open bar type in order to let dirt drop out between the bars. This elevating conveyor 110, in this device, carries the plants, with the tomatoes still attached, up at a gentle angle of about 30 degrees. This is made possible because of the overall length of the harvester assembly 21, as compared with a comparable self-controlled unit, thereby enabling it to have this gentler angle of pickup which helps to disturb the tomatoes less, and results in fewer tomatoes being cut here. It also gives a somewhat longer run during which loose dirt can fall out to the ground.

The clod conveyor 33 (FIGS. 1-4)

Between the rear end 111 of the elevating conveyor 110 and the front end 112 of the separator unit 26, there is a transfer conveyor 114 providing open spaces 113 over which the plants pass and including rollers 115. Beneath the spaces 115, which may be adjusted for size, is the clod conveyor 33, the frame for which may be mounted directly on the intermediate cross member 51. The clod conveyor 33 (like the clod conveyor in U.S. Pat. No. 4,118,311) crosses from one side of the harvester assembly 21 to the other and collects from that space all loose tomatoes, loose clods of dirt, loose trash, and any remaining loose dirt and carries them out preferably to one side of the harvester 21, (though, of course, the conveyor 33 could be made in two units to move out to each side, but that is unnecessary). At the outboard end 116 of the clod conveyor 33 an operator may remove the good tomatoes from the clod conveyor 33 and let the dirt, clods, and the culled tomatoes simply fall off the end and pass down a chute 117, like that which has been shown in U.S. Pat. No. 4,118,311.

It will be noted how few connections are needed to secure in place the pickup unit 25, the clod conveyor 33, and the chute 117 to the main frame 40.

The separator unit 26 (FIGS. 1, 2, and 4-7)

The separator unit 26 may be a shaker device, like that shown in U.S. Pat. No. 4,088,570. This unit may be made so that it can be mounted with only four bolts onto pads 121, 122, 123, and 124 on the cross frame members 51 and 52, as shown in FIGS. 5-7. Hence, the entire unit 26 is easily removed for shipping, as can be the pickup unit 25, too, if that be desired. When the pickup unit 26 is removed, as shown in FIG. 4, it is clear that there are no obstructions or machinery below the separator unit 26.

When the separator unit 26 is in place, it includes a shaking device 125, and, below that a collecting conveyor 126 of the bar type through which loose dirt and trash can fall down to the ground without in any way gumming up any operating mechanism. This collecting conveyor 126 then carries the collected tomatoes to the rear and deposits them on one of a pair of rear cross conveyors 27. The vines and trash carried by the shaker 125 is dumped out from end 127 of the separator unit 26 depositing the vines and remaining leaves, and so on, in the ground, substantially at the location where the vines were picked up.

The conveyor systems from the separator unit to the delivery unit (FIGS. 1 and 2)

Each cross conveyor 27 delivers its tomatoes transversely and transfers them to a forwardly moving conveyor 28. Various systems may be used, there may be a single forwardly moving conveyor on each side with the tomatoes being manually separated by operators, but generally it is preferable to use an automatic sorting device 31, such as is shown in U.S. Pat. No. 4,118,311, issued Oct. 3, 1978.

The mechanical sorter 31 may be followed by the upwardly and forwardly directed flighted conveyor 29 leading to another forwardly moving conveyor belt 30. On one side of the harvester 21 the conveyor 30 lies below the end portion of the clod conveyor 33.

At the forward end of these forward conveyors 30, the tomatoes are transferred to the front cross-conveyor 34.

Sorters may stand on the platform 32 provided for that purpose. The front cross conveyor 34 runs across the ends of both of the conveyors 30, receives their tomatoes, and deposits them on the delivery conveyor 35 which carries them up and out to deposit them in trailer bins or other collecting devices, as is conventional and is not shown here.

Each of the conveyors 27, 28, 29, 30, and 34 are separate units that are easily and readily mounted, detachably, on the frame 40, some super structure being usually provided for that purpose. Similarly, the electromechanical sorters 31 and the platform 32 are mounted to the frame 40 in any suitable manner.

The tongue 22 (FIGS. 1 and 2)

The tongue 22 is shaped in any desirable manner to avoid conflict with any of the other parts of the harvester 21. It may be made to pivot at each end in a horizontal plane and somewhat in a vertical plane, and preferably is. The tongue 22 may thus have at its forward end a pivot pad 130 with a pivot pin 131 that fits in a suitable journal 132 on the tractor 20, and at its rear end, it has a pivot pad 133 that fits on a pad 134 on the front cross member 50 of the frame 40, with a pivot pin 135 there. The connections at each end may include a latching mechanism allowing play but limiting it to a small angle. The tongue 22 is made long enough to enable the harvester assembly 21 to be offset from the tractor 20 by at least one complete bed or row.

Figure 10:
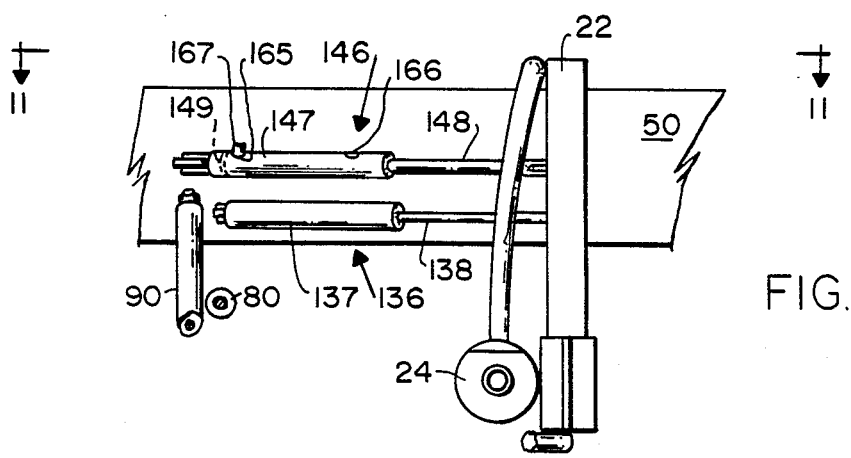
FIG. 10 is a view in end elevation of a portion of the tongue of FIG. 9 and adjacent parts of the harvester assembly.
Figure 11:
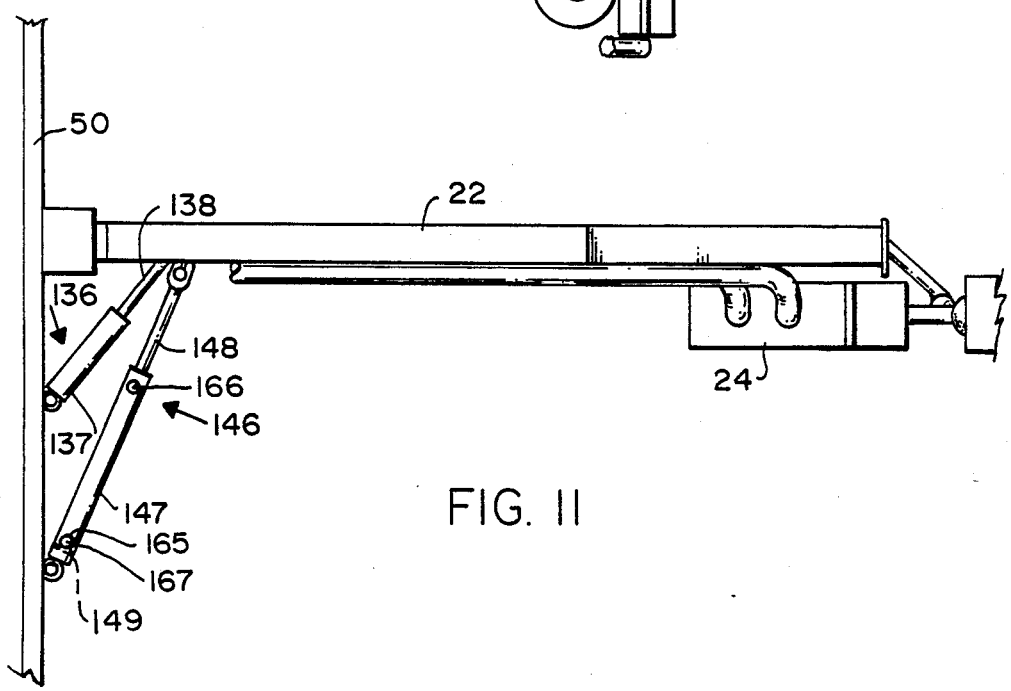
FIG. 11 is a top plan view looking down on FIG. 10.

At its forward end, the tongue 22 may support the pump 24 (see FIG. 9) and near its rear end a hydraulic apparatus 136 may have its cylinder 137 pivotally mounted to the harvester frame 40 and its piston rod 138 pivotally mounted to the tongue 22 (see FIGS. 10 and 11).

Figure 14:
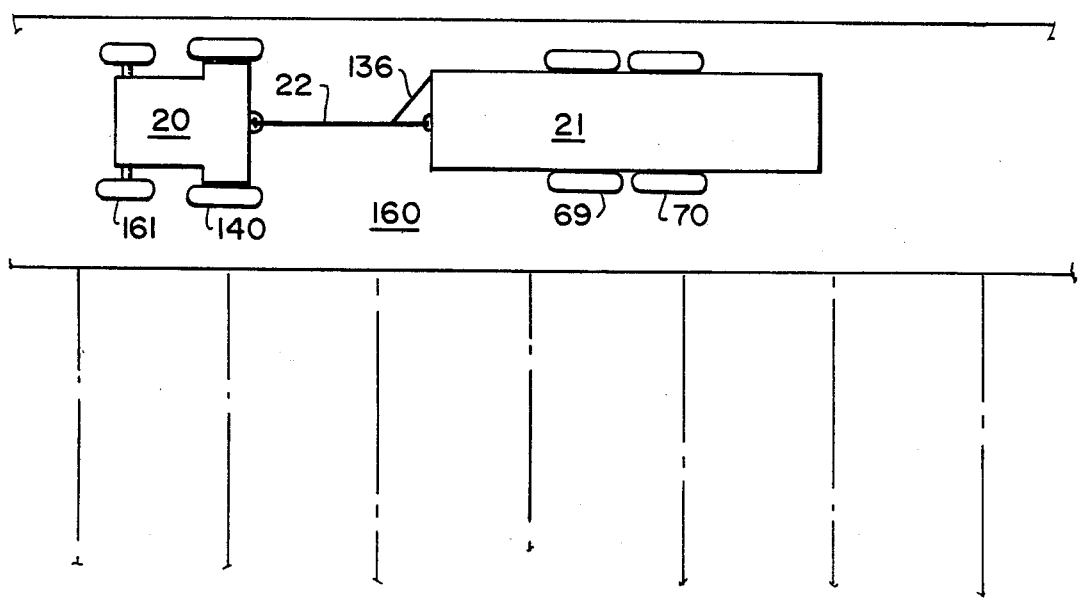
Figure 15:
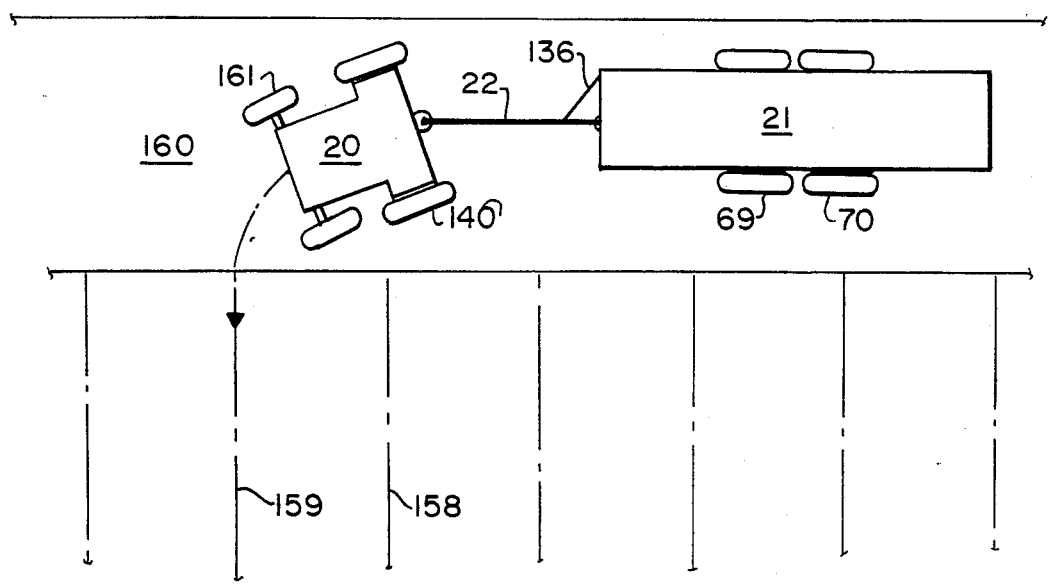

Thus, as shown in FIG. 2, and in FIGS. 14 and 15, the harvester assembly 21 may be used in a straight forward position as shown following directly behind the tractor 20, or the harvester assembly 21 may follow at either side of the tractor 20, as it preferably does during actual harvesting. (See FIGS. 1, 12, and 16.) Then, as shown diagrammatically in FIG. 2, the tractor's wheels 140 can run in furrows 141, 142 on each side of a bed 143 which has already been harvested, while the harvester's wheels 69 and 70 run in the furrows 142 and 144 on each side of a bed 145 being harvested, one furrow 142 being shared in common by the beds 143 and 145. Thus, the bed 145 being harvested is not at all subject to damage it would receive were the tractor 20 to run over it. The straight-ahead linkage is sometimes used when harvesting in places permitting no offset; it is also used when moving the harvester around on roads, headlands, or other relatively narrow passages. The bed 143 is either a previously harvested bed or an empty space provided to get things started at one or both ends of the field.

The movement between the straight-ahead linkage and the offset linkage is accomplished with the aid of the hydraulic linkage 136, which is connected to the hydraulic system and which is operated by a suitable control lever usually by an operator on the platform 105 in the box-like structure 106. To simplify operations and provide stops and locks, there is preferably a telescoping assembly 146, comprising an outer cylinder 147 pivoted to the harvester frame 40 and an inner cylinder 148 pivoted to the tongue 22. The assembly 146 is preferably made suitable for the widest row spacing (e.g., 66" between furrows) to be used, and a short insert spacer 149 is placed in the inner end of the outer cylinder 147 when a shorter row spacing (e.g. 60" between furrows) is to be used. Holes 165 and 166 are provided in both cylinders 147 and 148, so that a pin 167 can be dropped into the holes 165 to retain the assembly 146 in the exact extended position for use when harvesting or can be dropped into the holes 166 when the tractor 20 is to be followed directly in line by the harvester 21, as when moving them along a road. The locking pin 167, when used, enables release of the hydraulic apparatus 136 and reliance solely on the mechanical linkage thereby set up. When unlocked, the cylinder 147, with or without the spacer 149, enables the hydraulic apparatus 136 to extend until the solid end of the inner cylinder 148 abuts the inner end of the outer cylinder 147 or the spacer 149, which then automatically prevents further extension of the hydraulic apparatus 136.

The hydraulic system

The harvester 21 includes a large hydraulic fluid cooling device 150 (FIG. 1) mounted at the rear of the main beam member 41, which is therefore longer than the beam 42 on the other side. Also, at the forward end of that same beam is mounted a hydraulic fluid supply tank 151, which normally has a capacity of about 50 gallons. These devices 150 and 151 are preferably made so that they can serve as counter weights relative to other machinery and are mounted on the harvester unit 21 rather than the tractor. The hydraulic conduits are connected to suitable pressure and return manifolds. A suitable pump 152 (FIG. 1) or 24 (FIG. 9) sends the fluid via conduits 153 from the tank 151 to the inlet or pressure manifold, from which conduits go via suitable on-off, pressure limiting valves to the various units needing power, including the cutting sickle 77, the raising and lowering hydraulic cylinders 93 for the gauge wheels 92, the cylinders 80 raising and lowering the pickup frame 75, the motors for the elevating conveyor 110 of the pickup unit 25, to the crank of the separator unit 26, and to the collecting conveyor 126, to the rear cross conveyors 27, front cross conveyors 34, and the forwardly moving conveyors 28, 29, and 30, and to the other moving mechanisms on the harvester assembly 21. The power for the pump 152 is supplied by the power take-off unit 23 of the tractor 20, with the conduits 153 leading from the pump 152 to the manifolds, there being recirculation and cooling as needed. The tractor 20 itself does not have to be burdened with either the storage tank 151 for the large amount of additional fluid needed by this hydraulic system, or the cooling device 150.

Some general features

A typical large harvester assembly 21 of this invention can weight about 17,500 pounds, of which about 15,400 pounds is borne by the wheels 69 and 70 and about 2,100 bears on the tongue 22.

The width in the field is about fourteen feet-six inches, which when transported can be narrow to below twelve feet, both widths excluding the delivery elevator. The height of the entire assembly 21 can be about 9½ feet per shipping and, in the field with the elevator folded, about 12½ feet. The tread width is adjustable from five to five and one-half feet.

Maneuvering the tractor-harvester combination (FIGS. 12–16)

Figure 12:
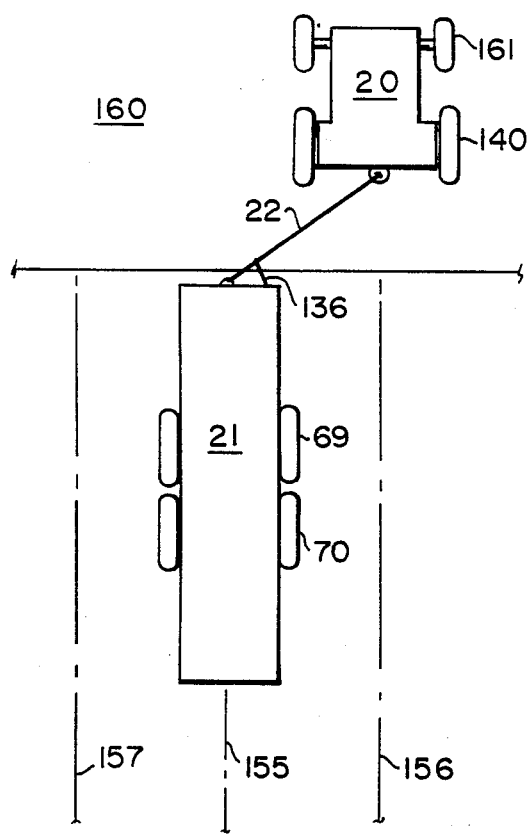
FIGS. 12–16 are diagrammatic views of a tractor and harvester of this invention making a turn to go from the end of a first-harvested row to the beginning of the next row to be harvested.

The series of views comprising FIGS. 12–16 illustrated diagrammatically how the combination of the tractor 20 and the harvester assembly 21 can operate in a restricted space after one row 155 has been harvested. They illustrate the maneuverability of the combination made possible by its structure. On the right of the row 155, there is an already-harvested row 156 along which the tractor 20 has been moving (FIG. 12). To the left of the row 155 is an unharvested row 57 which must not be damaged.

The harvesting preferably operates on outside rows first and gradually works in from each side of the field. Therefore, the row 157 will not (usually) be harvested next, but a row 158 (FIGS. 15 and 16) (which may be close or may be some distance away) will be the next to be harvested. To the left of the row 158 is an already-harvested row 159, down which the tractor 20 will move. In between the rows 157 and 158 are the other unharvested rows.

At the ends of the rows are headlands 160 (see especially FIGS. 14 and 15) down which the tractor 20 and harvester 21 will move. The headlands 160 are the length of the planted area but are preferably narrow, since they represent loss in planted acreage. The present invention enables them to be very narrow.

As shown in FIG. 12, the tractor 20 is offset one row from the harvester 21 and the tongue 22. The tractor's rear wheels 140 have been running in the furrows on each side of the row 156, and so have its front wheels 161, the only wheels of the combination that can be turned, for the wheels 140 are always in alignment with the fore-to-aft axis of the tractor 20, and the wheels 69 and 70 of the harvester assembly 21 are always in alignment with the fore-to-aft axis of the harvester assembly 21. During harvesting of the row 155, the tongue 22 has been retained at its proper angle by the hydraulic assembly 136 and the shock-absorbing alignment assembly 144 (the latter not being shown in FIGS. 12–16 to avoid complications). The assembly 136 is in a retracted position at this time.

Figure 13:
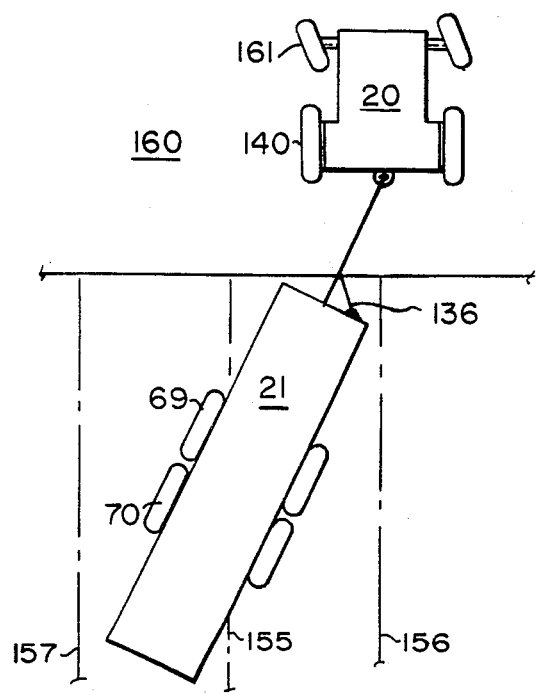

To get the harvester 21 out of the row 155 without damaging the unharvested row 157 to its left, the tractor 20 begins to move forward and in a left turn as in shown in FIG. 13, when the wheels 161 have been turned. At this time, the hydraulic device 136 is extended to move the tongue 22 from an acute angle (FIG. 12) with the transverse front end of the harvester 21 (on the side to which the device 136 is affixed) to an obtuse angle (FIG. 13). The wheels 69 and 70 never move to the left but gradually move to the right as the combination moves forwardly.

By the time the position of FIG. 14 has been reached, the tractor 20 has completed its 90° turn to the left and the harvester 21 has passed through a larger angle, with the aid of the hydraulic assembly 136 which is at first extended greatly and then is retracted somewhat as the position of direct following is reached in FIG. 14, where the angle between the tongue and the front end of the harvester 21 is now a right angle. There is no offset; so only a narrow headland 160 is required.

In FIG. 15, the tractor 20 turns to enter the row 159 by first going slightly past it and then turning back at a little more than 90°. The hydraulic device 136 is first lengthened and then gradually shortened until it reaches the position in FIG. 16 where the harvester 21 is offset from the tractor 20 by one row, going into the row 158.

Figure 16:
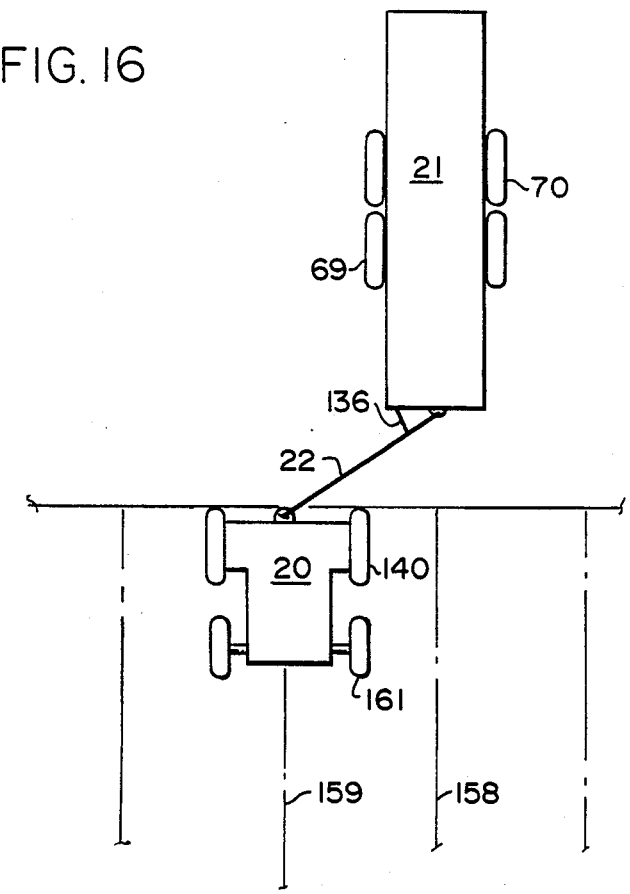

The position in FIG. 16 is 180° from the position in FIG. 12 and has been accomplished in a very limited space.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A single row tomato harvester for harvesting a row crop planted in parallel beds of identical width defined on each side by a furrow, including in combination:
   a tractor fully supported on its own wheels, the wheels being spaced apart widthwise at a distance sufficient to bridge a planted bed and ride in its furrows, said tractor having its own motive power plus a power-take-off unit,
   a harvester assembly having no motive power, partially supported on wheels spaced apart widthwise at substantially the same distance as those of the tractor, and
   a tongue pivotally connected at one end to said tractor and at its other end to said harvester, said harvester thereby being connected to and partially supported by said tractor, and whereby said harvester assembly and tractor can be offset so that said harvester assembly can harvest one bed while said tractor passes over an already harvested bed or a bed-free area, so that the tractor does not damage unharvested beds,
   said harvester assembly comprising,
   a main frame supporting all the other elements of said assembly and made up only five main members, namely of two parallel longitudinal beams, one on each side of said assembly, spaced apart from each other and each having front and rear ends, and three transverse cross members joined to said beams and spaced apart from each other, there being a front cross member adjacent to the front end of said frame, to which said tongue is pivotally attached a rear cross member adjacent to the rear end, and an intermediate cross member between them, all said beams and cross members being approximately on the same horizontal plane, said longitudinal beams, each supporting one of two parallel, upwardly extending vertical columns with upper bracket members at upper ends thereof, near and forward of said intermediate cross member, a pair of bracket assemblies secured to said beams in transverse alignment with each other and extending down below said beams, a pair of truck assemblies pivotally secured to said bracket assemblies and having wheels for support of said main frame located entirely below the horizontal plane of said main frame, each wheel being rotatably mounted on a stub shaft, there being no axles, shafts, or other cross members extending across said frame below said frame cross members, a pickup unit pivotally attached at a rear end to said upper bracket members and extending forwardly from them and having cutting means at the forward end and elevating means extending rearwardly and upwardly therefrom, power means for raising and lowering the front end of said pickup unit, pivotally secured to said main frame beams and to said pickup unit, a separator unit having means for separating the tomatoes from the plants, secured to said intermediate and rear cross-members, to the rear of said pickup unit and in between said beams, a conveyor and sorting system comprising a series of conveyor units each secured to said main frame and providing means outboard of said beams for conveying the separated tomatoes from the rear of said separating unit back on each side of said separator unit past sorting means supported outboard of said conveyor units by said main frame for culling the tomatoes and to delivery means to the front end of said harvester, forward of said separator unit and above said front cross-beam, thereby shortening the harvester length, and hydraulic means connected to said tractor power-take-off unit and having conduits extending therefrom to all the powered systems of said harvester assembly, whereby, when said power means raises said pickup unit and holds it up above the bottom of said main frame, said harvestor assembly can offset from the tractor to an adjacent row and can by pulled by said tractor along and over an unharvested row of said crop without damaging said crop.

2. The harvester of claim 1 wherein
said tongue is pivotally attached at its rear end to said front cross member and detactably pivotally attached at its front end to said tractor and comprises the sole structural member tying together said harvester assembly and said tractor, said tongue being sufficiently long, so that while said harvester assembly may trail directly behind said tractor and span the said previously unharvested bed, said tractor may also be offset by one bed from said harvester assembly so that the tractor can run over an already harvested bed while the harvester assembly proceeds along a bed that it then harvests, generally horizontal powered cylinder-piston means attached pivotally at one end to said main frame at a point spaced from said tongue and attached pivotally at its other end to said tongue at a point spaced from said main frame, for shifting the relative lateral positions of said tractor and said harvester assembly from a position where said harvester assembly is offset at least one full row to the side of said tractor to a position where said harvester assembly is aligned with said tractor and to any position in between, whereby the radius of turning of the tractor-harvester assembly combination can be reduced greatly for turning.

3. The harvester of claim 2 having a non-powered telescoping assembly pivotally attached at one end to said main frame and at the other end to said tongue, to limit the maximum extension of said cylinder-piston assembly, said telescoping assembly also comprising specially located holes through its telescoping members and a removable pin for use therewith to lock said telescoping assembly in a position where said harvester assembly is offset from said tractor, for harvesting, or in a position axially in line with said tractor for non-harvesting towing, whereby when said locking pin is in place, hydraulic pressure need not be applied to said cylinder-piston assembly.

4. The harvester of claim 2 in which
said hydraulic means includes
a main pump mounted on said tongue at one side thereof and connected to said tractor power-take-off unit, and
conduit means extending from said pump along said tongue to said harvester assembly.

5. The harvester of claim 1 having automatic height control means on said harvester assembly, including an instantaneous vertical distance-determining device mounted on said pickup unit to the rear of said cutting means, for automatically actuating and controlling said power means to maintain said cutting means at a substantially constant depth below ground without action of the operator of said tractor.

6. A single row tomato harvester for harvesting a row crop planted in parallel beds of identical width defined on each side by a furrow, including in combination:
a tractor fully supported on its own wheels, the wheels being spaced apart widthwise at a distance sufficient to bridge a planted bed and ride in its furrows, said tractor having its own motive power plus a power-take-off unit,
a harvester assembly having no motive power, partially supported on wheels spaced apart widthwise at substantially the same distance as those of the tractor, and
a tongue connected at one end to said tractor and at its other end to said harvester, said harvester thereby being connected to and partially supported by said tractor, said harvester assembly comprising,
a main frame supporting all the other elements of said assembly and made up of two parallel longitudinal beams, one on each side of said assembly, spaced apart from each other and each having front and rear ends, and three transverse cross members joined to said beams and spaced apart from each other, there being a front cross member adjacent to the front end of said frame, a rear cross member adjacent to the rear end, and an intermediate cross member between them, all said beams and cross members being approximately on the same horizontal plane, brackets secured to said beams in transverse alignment with each other and extending down below said beams, a pair of truck assemblies pivotally secured to said brackets and having wheels for support of said main frame located entirely below the horizontal plane of said main frame, each wheel being rotatably mounted on a stub shaft, there being no axles, shafts, or other cross members extending across said frame below said frame cross members, a pickup unit pivotally attached to said main frame at the front end thereof and extending forwardly from it and having cutting means at the forward end and elevating means extending rearwardly and upwardly therefrom, power means for raising and lowering the front end of said pickup unit, pivotally secured to said main frame and to said pickup unit, a separator unit having means for separating the tomatoes from the plants, secured to said frame to the rear of said pickup unit, said separator unit being detachably secured as a unit to said frame at only four points, all to the rear of said pickup unit, a conveyor and setting system comprising a series of conveyor units each secured to said main frame and providing means for conveying the separated tomatoes from said separating unit past sorting means supported by said main frame for culling the tomatoes and to devliery means, and hydraulic means connected to said tractor power-take-off unit and having conduits extending therefrom to all the powered systems of said harvester assembly.

7. A single row tomato harvester for harvesting a row crop planted in parallel beds of identical width defined on each side by a furrow, including in combination:

a tractor fully supported on its own wheels, the wheels being spaced apart widthwise at a distance sufficient to bridge a planted bed and ride in its furrows, said tractor having its own motive power plus a power-take-off unit, a harvester assembly having no motive power, partially supported on wheels spaced apart widthwise at substantially the same distance as those of the tractor, and a tongue connected at one end to said tractor and at its other end to said harvester, said harvester thereby being connected to and partially supported by said tractor, said harvester assembly comprising, a main frame supporting all the other elements of said assembly and made up of two parallel longitudinal beams, one on each side of said assembly, spaced apart from each other and each having front and rear ends, and three transverse cross members joined to said beams and spaced apart from each other, there being a front cross member adjacent to the front end of said frame, a rear cross member adjacent to the rear end, and an intermediate cross member between them, all said beams and cross members being approximately on the same horizontal plane, brackets secured to said beams in transverse alignment with each other and extending down below said beams, a pair of truck assemblies pivotally secured to said brackets and having wheels for support of said main frame located entirely below the horizontal plane of said main frame, each wheel being rotatably mounted on a stub shaft, there being no axles, shafts or other cross members extending across said frame below said frame cross members, a pickup unit pivotally attached to said main frame at the front end thereof and extending forwardly from it and having cutting means at the forward end and elevating means extending rearwardly and upwardly therefrom, support pillars extending upwardly from said beams adjacent to said intermediate cross member and through which said pickup unit is pivotally attached to said main frame, power means for raising and lowering the front end of said pickup unit, pivotally secured to said main frame and to said pickup unit, a separator unit having means for separating the tomatoes from the plants, secured to said frame to the rear of said pickup unit, a conveyor and sorting system comprising a series of conveyor units each secured to said main frame and providing means for conveying the separated tomatoes from said separating unit past sorting means supported by said main frame for culling the tomatoes and to delivery means, and hydraulic means connected to said tractor power-take-off unit and having conduits extending therefrom to all the powered systems of said harvester assembly.

8. A tomato harvester, including in combination:

a tractor fully supported on its own wheels and having its own motive power plus a power take-off unit, and a harvester assembly having no motive power, partially supported on wheels and connected to and partially supported by said tractor, said harvester assembly comprising, a wheel-supported main frame, a pickup unit pivotally attached to said main frame at the front end thereof and extending forwardly from it and having curring means at the forward end and elevating means extending rearwardly and upwardly therefrom, power means for raising and lowering the front end of said pickup unit, pivotally secured to said main frame and to said pickup unit, a powered separator unit having means for separating the tomatoes from the plants, secured to said frame to the rear of said pickup unit, said powered separator means being detachably secured at only four points to said frame, to the rear of said pickup unit, a conveyor and sorting system comprising a series of conveyor units each secured to said main frame and providing means for conveying the separated tomatoes from said separating unit past sorting means supported by said main frame for culling the tomatoes and to delivery means, hydraulic means on said main frame connected to said tractor power-take-off unit and having conduits extending therefrom to all the powered systems of said harvester assembly, and automatic height control means for actuating and controlling said power means to maintain said cutting means at a substantially constant depth below ground.

9. A tomato harvester assembly comprising,
a wheel-supported main frame,
said main frame having two longitudinal beams,
brackets secured to said beams in transverse alignment with each other and extending down below said beams,
a pair of truck assemblies pivotally secured to said brackets and having wheels for support of said main frame located entirely below said main frame, each wheel being rotably mounted on a stub shaft, so that there are no axles, shafts or other cross members extending across said frame below said beams,
a pickup unit pivotally attached to said main frame at the front end thereof and extending forwardly from it and having cutting means at the forward end and elevating means extending rearwardly and upwardly therefrom,
support pillars extending upwardly from said intermediate cross member and through which said pickup unit is pivotally attached to said main frame,
power means for raising and lowering the front end of said pickup unit, pivotally secured to said main frame and to said pickup unit,
a separator unit having means for separating the tomatoes from the plants, secured to said frame to the rear of said pickup unit,
a conveyor and sorting system comprising a series of conveyor units each secured to said main frame and providing means for conveying the separated tomatoes from said separating unit past sorting means supported by said main frame for culling the tomatoes and to delivery means, and
hydraulic means on said main frame having conduits extending therefrom to all the powered systems of said harvester assembly.

10. A tomato harvester assembly comprising,
a wheel-supported main frame,
said main frame having two longitudinal beams,
brackets secured to said beams in transverse alignment with each other and extending down below said beams,
a pair of truck assemblies pivotally secured to said brackets and having wheels for support of said main frame located entirely below said main frame, each wheel being rotatably mounted on a stub shaft, so that there are no axles, shafts or other cross members extending across said frame below said beams,
a pickup unit pivotally attached to said main frame at the front end thereof and extending forwardly from it and having cutting means at the forward end and elevating means extending rearwardly and upwardly therefrom,
power means for raising and lowering the front end of said pickup unit, pivotally secured to said main frame and to said pickup unit,
a separator unit having means for separating the tomatoes from the plants, secured to said frame to the rear of said pickup unit,
a conveyor and sorting system comprising a series of conveyor units each secured to said main frame and providing means for conveying the separated tomatoes from said separating unit past sorting means supported by said main frame for culling the tomatoes and to delivery means, and
hydraulic means on said main frame having conduits extending therefrom to all the powered systems of said harvester assembly,
said main frame supporting all the other elements of said harvester assembly its two longitudinal beams being parallel to and spaced apart from each other, one on each side of said assembly, each having front and rear ends, said frame also having three transverse cross members joined to said beams spaced apart from each other, there being a front cross member near the front end, a rear cross member near the rear end, and an intermediate cross member between them, all said beams and cross members being approximately on the same horizontal plane,
said separator unit being detachably attached by bolts at two places each on said intermediate and rear cross members.

* * * * *

UNITED STATES PATENT AND TRADEMARK OFFICE
CERTIFICATE OF CORRECTION

PATENT NO. : 4,584,826
DATED : April 29, 1986
INVENTOR(S) : Thomas S. Bettencourt & Darryl G. Bettencourt It is certified that error appears in the above-identified patent and that said Letters Patent are hereby corrected as shown below:

Column 10, line 26, before "length" insert --shortened--.
Column 13, lines 32-33, "illustrated" should read --illustrate--
Column 13, line 40, "row 57" should read --row 157--.
Column 15, line 53, "can by pulled" should read
                    --can be pulled--.
Column 17, line 26, "setting" should read --sorting--.
Column 18, line 45, "curring" should read --cutting--.
Column 19, line 23, before "intermediate" insert
                    --beams adjacent to said--.

Signed and Sealed this

Nineteenth Day of August 1986

[SEAL]

Attest:

DONALD J. QUIGG

Attesting Officer

Commissioner of Patents and Trademarks